United States Patent [19]

McCorkle

[11] 4,234,852
[45] Nov. 18, 1980

[54] COHERENT FREQUENCY SHIFT KEY DEMODULATOR

[76] Inventor: John W. McCorkle, 2009 Evansdale Dr., Adelphi, Md. 20783

[21] Appl. No.: 960,992

[22] Filed: Nov. 15, 1978

[51] Int. Cl.³ .......................................... H04L 27/14
[52] U.S. Cl. ..................................... 329/50; 329/122; 329/124; 375/91; 375/120
[58] Field of Search .................... 329/50, 122, 124; 375/91, 120; 325/320

[56] References Cited

U.S. PATENT DOCUMENTS

| | | | |
|---|---|---|---|
| 3,743,775 | 7/1973 | Hutchinson et al. | 325/320 X |
| 4,072,905 | 2/1978 | Keelty | 325/320 X |

Primary Examiner—Siegfried H. Grimm
Attorney, Agent, or Firm—R. S. Sciascia; A. L. Branning; D. A. Lashmit

[57] ABSTRACT

Disclosed is a frequency shift key demodulator for the coherent detection of both mark and space tones. Cross coupled phase locked loops lock onto and track the difference in frequency between translated mark and space tones. An additional set of cross coupled phase locked loops locks onto and tracks overall frequency drift of the mark and space tones. Signals are generated within the first set of cross coupled loops allowing for coherent detection thereby permitting detection during signal to noise ratios of less than one. Loop bandwidths can be independently controlled and are independent of the data rate thus permitting wide system flexibility.

10 Claims, 7 Drawing Figures

COHERENT FREQUENCY SHIFT KEY DEMODULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the detection of frequency shift key signals and more specifically to the particular demodulating schemes employed by such receivers. With even greater specificity this invention relates to receiving schemes utilizing coherent mark and space detection.

Frequency shift key signals result when data modulate a carrier by shifting its frequency between two distinct levels known as mark and space tones, or frequencies based upon the status of the data being transmitted. Common methods for demodulating such signals included the use of a discriminator, a single phase locked loop, two narrow band filters followed by amplitude detection, or using two phase locked tone decoders. Both the discriminator method and the single phase locked loop method are quite sensitive to interference as they respond to all frequencies between the mark and space tones plus a range of frequencies that are outside of the mark and space tone range. Techniques utilizing complex narrow band filters become intolerant of overall frequency drift (including doppler shift). In order to reduce the lock up time, when utilizing dual phase locked tone decoders, the phase locked loop bandwidth must be made substantially wider than the width optimum for detection. This wide loop bandwidth renders such dual phase locked tone decoders susceptible to interference.

SUMMARY OF THE INVENTION

It is therefore an object of the present invention to provide a system for accurately demodulating frequency shift key (FSK) modulated signals.

A further object of the present invention is to provide a system capable of accurately demodulating FSK signals under poor signal to noise conditions.

Still another object of the present invention is to provide an FSK demodulator utilizing coherent detection.

Yet another object of the present invention is to provide an FSK demodulator for the detection of the FSK signals wherein the modulation parameters of said signals vary in time.

These and other objects of the present invention are accomplished by providing an FSK demodulator utilizing cross coupled phase locked loops for locking onto and tracking both mark and space tones simultaneously.

A first phase locked loop having space and mark tone sub-loops, share in common a summer, a filter and a first voltage controlled oscillator. The output of the first voltage controlled oscillator is coupled through separate dividers to space tone and mark tone phase detectors which are in turn coupled back to the summer. The divisors of both dividers are chosen such that this first phase locked loop tracks the difference between mark and space tone frequencies. In addition, the first phase locked loop generates space and mark tone detection mix signals used for coherent detection of both mark and space tones.

A second phase locked loop having both space and mark tone subloops share in common a mixer providing translation of both mark and space tones, a summer, a filter, and a second voltage controlled oscillator. The mixer output is coupled to both the space and mark tone phase detectors. This second phase locked loop tracks the overall frequency drift of both mark and space tones and controls the translation mix frequency thereby compensating for drift.

BRIEF DESCRIPTION OF THE DRAWINGS

The many attendant advantages and features of the present invention will be appreciated from the following detailed description with its accompanying claims, when read with reference to the figures wherein like reference numerals designate like or corresponding parts throughout and wherein:

DETAILED DESCRIPTION OF THE PREFERRED EMBODIMENTS

Figure 1:
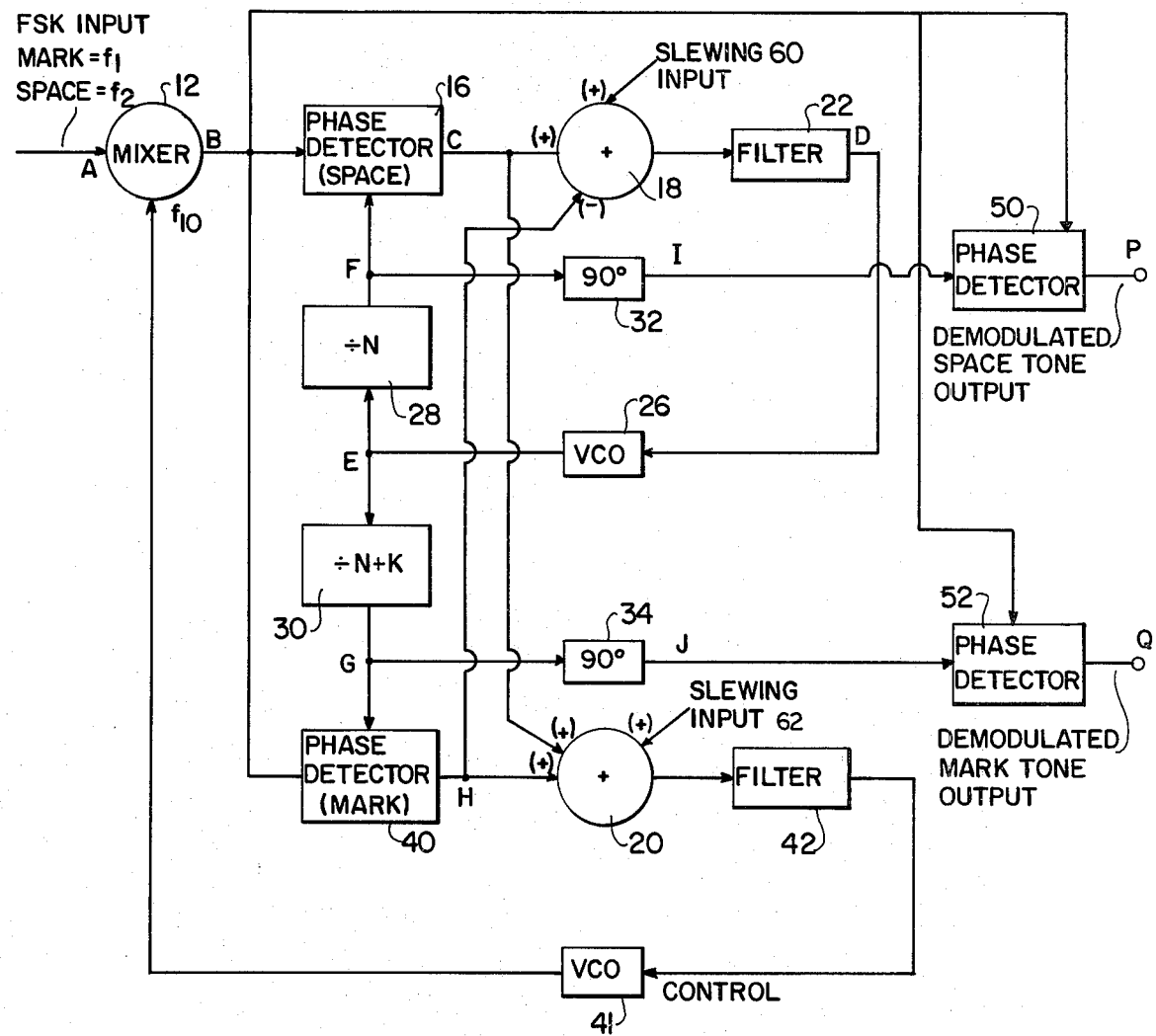
FIG. 1 is a block diagram of the frequency shift key demodulator according to the present invention.

Referring now to FIG. 1, which is a block diagram of the frequency shift key demodulator according to the present invention, signals containing data that is frequency shift key modulated are applied to a mixer 12 at point A. Mixer 12 translates the FSK signals received at point A according to an input mix signal $f_{10}$ applied at its second input port. The output of mixer 12 at point B contains mark and space frequencies translated by input mix signal $f_{10}$. The output of mixer 12 at point B is coupled to one input of a phase detector 16 (space) and one input of a phase detector 40 (mark). The output of phase detector 16 at point C is coupled to one positive input of a summer 18 and to a positive input of a second summer 20. The output of summer 18 is coupled to a filter 22 which in turn is coupled at point D to the input of a voltage controlled oscillator 26. Of course, depending upon the transfer function desired for the loop, a separate integrator can be coupled between the output of filter 22 and the control input of voltage controlled oscillator 26. The output of voltage controlled oscillator 26 is coupled at E to two dividers 28 and 30. Divider 28 has a divisor equal to N where N is an integer and divider 30 has a divisor equal to N+K where K is also an integer. The output of divider 28 is coupled at point F to the second input of phase detector 16 and to a 90° phase shifter 32. The output of divider 30 is coupled to the second input of phase detector 40 and to a 90° phase shifter 34.

the output of phase detector 40 at point H is coupled to both a negative input of summer 18 and to a positive input of summer 20. The output of summer 20 is coupled through a filter 42 to the control input of a voltage controlled oscillator 41. Depending upon the loop transfer function desired, a separate integrator can be coupled between the output of filter 42 and the control input of voltage controlled oscillator 41. The output of voltage controlled oscillator 41 provides the input mix signal for input mixer 12 and is coupled to its second input.

The output of phase shifter 32 at point I is coupled to one input of a phase detector 50, the second input of which is coupled to point B, the output of mixer 12. The output of phase shifter 34 at point J is coupled to one input of a phase detector 52, the second input of which is coupled to point B, the output of mixer 12. Phase detectors 50 and 52 provide coherent detection of space and mark tones, respectively.

Phase detector 16, summer 18, filter 22, voltage controlled oscillator 26 and divider 28 constitute a space tone sub-loop of a first phase locked loop. A mark tone sub-loop shares in common with the space tone sub-loop summer 18, filter 22 and voltage controlled oscillator 26 but utilizes divider 30 and phase detector 40 to complete the loop. Output signals from mixer 12 are coupled to both phase detectors 16 and 40 so that the first phase locked loop can be locked and tracking regardless of whether a mark or space tone is being received. The divisors of dividers 28 and 30 are chosen such that this first phase locked loop will lock onto and track the frequency difference between mark and space tones. This occurs because the signals at points F and G differ by the same amount that the mark and space tones differ in frequency. Therefore, the input at point G to phase detector 40 is a signal equivalent to the mark tone as translated, and the input signal to phase detector 16 at point F is equivalent to the space tone as translated. The frequencies generated within both sub loops at points G and F are dependent on one another and are both derived from the voltage controlled oscillator 26. The preset dividers 28 and 30 maintain this relationship at all times allowing the loop to track mark and space tones simultaneously.

The combination of divider 28 with phase shifter 32 provides a signal at point I that is in phase with the space tone frequency as translated. This signal is then used for coherent detection in phase detector 50. Likewise, the combination of divider 30 with phase shifter 34 provides a signal at point J in phase with the translated mark tone frequency. This signal at point J is used to coherently detect mark tones present at phase detector 52.

Of course, mark and space outputs from coherent detectors 50 and 52 can be combined to provide a clean output data stream. One such combination is suggested in FIG. 2, in which outputs from phase detectors 50 and 52 are combined in a summer 54, the output of which is coupled to a matched filter 56. The output of filter 56 is a clean combined demodulated data stream.

Mixer 12, phase detector 16, summer 20, filter 42 and voltage controlled oscillator 41 constitute the space tone sub-loop of a second phase locked loop. A mark tone sub-loop shares in common with this space tone sub-loop, mixer 12, summer 20, filter 42 and voltage controlled oscillator 41 but completes the sub-loop with phase detector 40 instead of phase detector 16. The output of voltage controlled oscillator 41, coupled to mixer 12, is the overall frequency translation mix signal and as such, automatically tracks and compensates for overall frequency drift of both mark and space tones when locked.

In conventional demodulation of FSK signals, frequency errors are dealt with as if the mark tone is too high or too low in frequency and/or the space tone is too high or too low in frequency. Referring again to FIG. 1, the frequency shift key demodulator according to the present invention deals with frequency errors as if the two tones are either too far apart or too close together in frequency and the mark tone or space tone is either too high or too low in absolute frequency. Voltage controlled oscillator 26 constantly strives to make the frequency at point F (the output of divider 28) different from the frequency at point G (the output of divider 30) by exactly the same absolute difference that the two incoming frequency shift key signal tones (mark and space) are different. Voltage controlled oscillator 41 shifts both mark and space tones simultaneously by controlling the input mix signal to mixer 12 to remove any overall frequency offset. Note that phase detector 16 is driven to lock onto space tones and phase detector 40 is driven to lock onto mark tones.

The outputs of phase detectors 16 and 40 are summed at summer 20 to provide an error signal for controlling voltage controlled oscillator 41. These detector outputs are summed because, if one assumes that the frequencies at point F and G differ by the same amount that the input signal mark and space tones differ in frequency, then the frequency error in the mark tone at the phase detector 40 would be the same as the error in the space tone at phase detector 16. Thus, each detector would register the same error and with both detectors providing information, voltage controlled oscillator 41 is controlled at all times independent of whether a mark or space tone is being received.

The output of phase detector 40 is substracted at summer 18 from the output of phase detector 16 to provide an error signal for controlling voltage controlled oscillator 26. When voltage controlled oscillator 26 is in a lock condition, the difference between the frequencies at points F and G are the same as the difference between the frequencies of the input mark and space tones. Thus, phase detector 16, when a space tone is being received, and phase detector 40, when a mark tone is being received, will register identical outputs at points C and H, the outputs of phase detectors 16 and 40, respectively. Substracting the two identical outputs results in a zero error signal generated within summer 18 to controlled voltage control oscillator 26. Thus, voltage controlled oscillator 26 stays locked. However, if the difference between the frequencies of signals at points F and G does not match the difference between the two input mark and space tone frequencies, then phase detectors 16 and 40 will have differing outputs. The resultant error signal from summer 18 forces voltage controlled oscillator 26 to change frequency until both phase detectors 16 and 40 have identical outputs. Note that since both mark and space tones are not received simultaneously, the output from summer 18 must be averaged by filter 22.

Once voltage controlled oscillators 26 and 41 are locked, mark and space tones are synchronously detected by using a signal 90 degrees out of phase with those at points F and G, respectively.

As with all phase locked loop circuits, provisions must be made to insure initial lock up of the loop. There are ample phase locked loop circuit designs in the literature featuring a search mode for lock acquisition. such circuits could be implemented so that manual tuning of this detector would be unnecessary. However, for simplicity the block diagram of FIG. 1 includes slewing input 60 to summer 18 and slewing input 62 to summer 20 for manual turning when mark and space tone frequencies are not well known. In fact, manual tuning might be desirable in certain applications. For example, in a typical high frequency communication station an operator usually manually tunes a single sideband high frequency receiver to a designated frequency to receive a message. The amount of frequency shift between mark and space tones is usually known to within a few percent. Under these conditions, the operator would manually slew summer 20 for the nominal amount of frequency shift between mark and space tones. Then he would tune the high frequency receiver for the proper beat frequency so that voltage controlled oscillator 41 would lock. Once voltage controlled oscillator 41 is locked, summer 18 can be slewed slowly until voltage controlled oscillator 26 locked. However, this final step is usually unnecessary as the difference frequency between mark and space tones is known accurately enough that voltage controlled oscillator 26 will pull into lock by itself.

Figure 3:
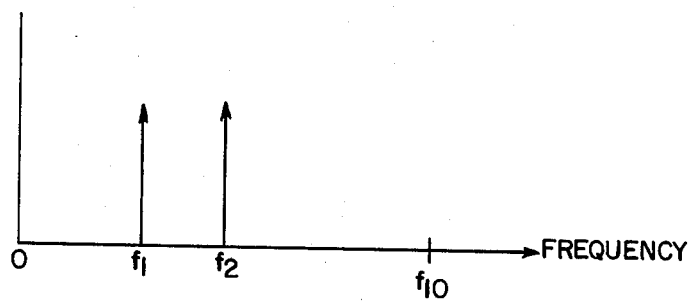
FIG. 3 is a graphical representation of the major signal components at point A of the block diagram of FIG. 1.
Figure 4:
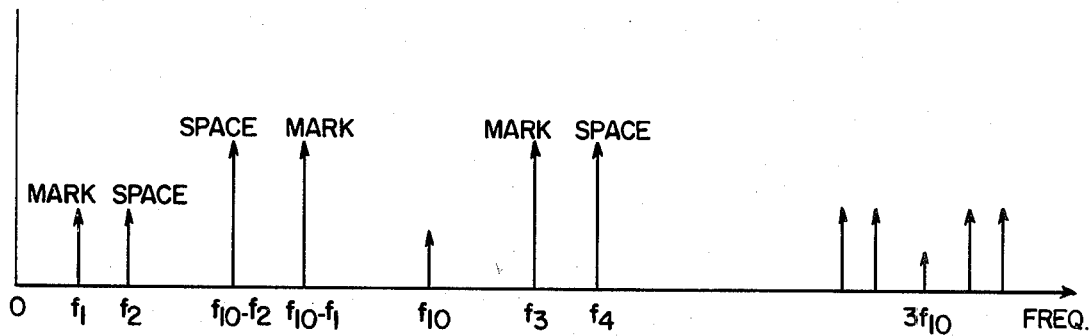
FIG. 4 is a graphical representation of the major signal components at point B of the block diagram of FIG. 1.

In order to better understand the operation of the frequency shift key demodulator according to the present invention key signals at various points in the block diagram will be examined. For convenience, the mark tone is designated as frequency $f_1$, and the space tone is designated as $f_2$. Mixer 12 translates these tones by multiplying them with input mix signal $f_{10}$ such that the translated mark tone has a frequency $f_3$ equal to $f_{10}+f_1$ and the translated space tone has a frequency $f_4$ equal to $f_{10}+f_2$. Continuing to refer to FIG. 1 and in addition to FIG. 3, which graphically represents signals at point A, the input to mixer 12, $f_1$ and $f_2$ are lower in frequency than $f_{10}$. Signals at point A would then be multiplied by $f_{10}$ in mixer 12 to produce the composite signal at point B, graphicaly represented in FIG. 4. At point B, both sum and difference signals plus the original signals (dependent upon how well mixer 12 is balanced) would be present. If $f_{10}$ included any harmonic content, side bands would appear on each side of those harmonics. At point B all of the signals are coupled to phase detectors 16 and 40.

Figure 5:
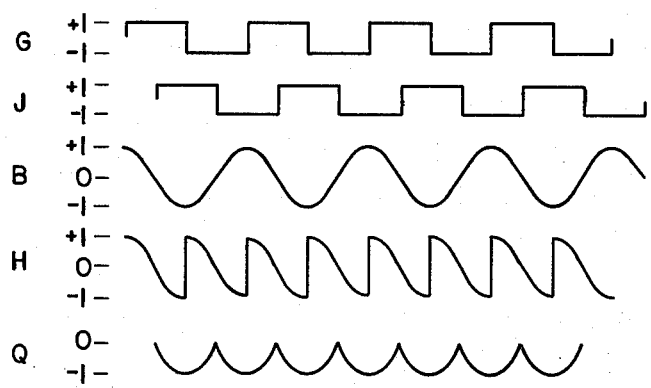
FIG. 5 is a graphical representation of signals at various points of the block diagram of FIG. 1 illustrating the coherent detection process.

Referring now to FIG. 5, which is a graphical representation of signals at various points of the block diagram of FIG. 1, the lettered indicators G, J, B, H and Q on the left refer to points dealing with mark tones. A corresponding graph would apply to the tone sub-loop operation at points F, I, B, C, and P. Square waves are utilized at points G and J for clarity. Simple multipliers are assumed for the phase detectors, although almost any type of phase detector would work. FIG. 5 shows how the phase of the signals produces a zero average at points C and H and a non-zero average at points P and Q. Phase detectors 16 and 40 are driven respectively with signals at points F and G that are 90° out of phase with the space and mark tones at point B. Therefore, any deviation from 90° for the space or mark tones result in an error voltage being produced at points C and H respectively.

The signals at points C and H are summed at summer 20 and coupled into a standard phase locked loop configuration including filter 42 and voltage controlled oscillator 41 which produces input mix signal $f_{10}$. This input mix signal can shift the mark and space tones up or down in frequency so that the loop remains locked.

The signal at point H is subtracted from the signal at point c at summer 18 and coupled to a standard phase locked loop configuration comprising filter 22, and voltage controlled oscillator 26. The frequency of voltage controlled oscillator 26 controls how much frequency difference there will be between points F and G.

There has therefore been provided a frequency shift key demodulator utilizing cross coupled phase locked loops to simultaneously lock onto mark and space tones and provide for coherent detection. This circuit allows for compensation due to overall frequency errors or to frequency difference errors between mark and space tones. Such a system allows for detection under extremely poor signal to noise conditions and where interference is present.

Figure 6:
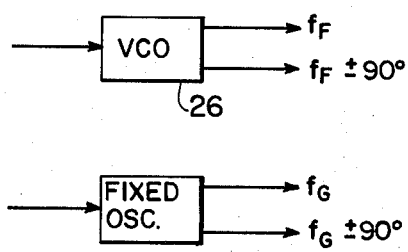
FIG. 6 is a block diagram illustrating an alternative manner for generating mark and space mix frequencies for detection.

Obviously, other embodiments and modifications of the present invention will readily come to those of ordinary skill in the art having the benefit of the teachings presented in the foregoing description and drawings. For example, there are several circuit arrangements whereby voltage controlled osicllator 26 can control the difference in frequency between two points. A simple and direct approach, illustrated in FIG. 6, would be to use a fixed oscillator and a voltage controlled oscillator.

Figure 7:
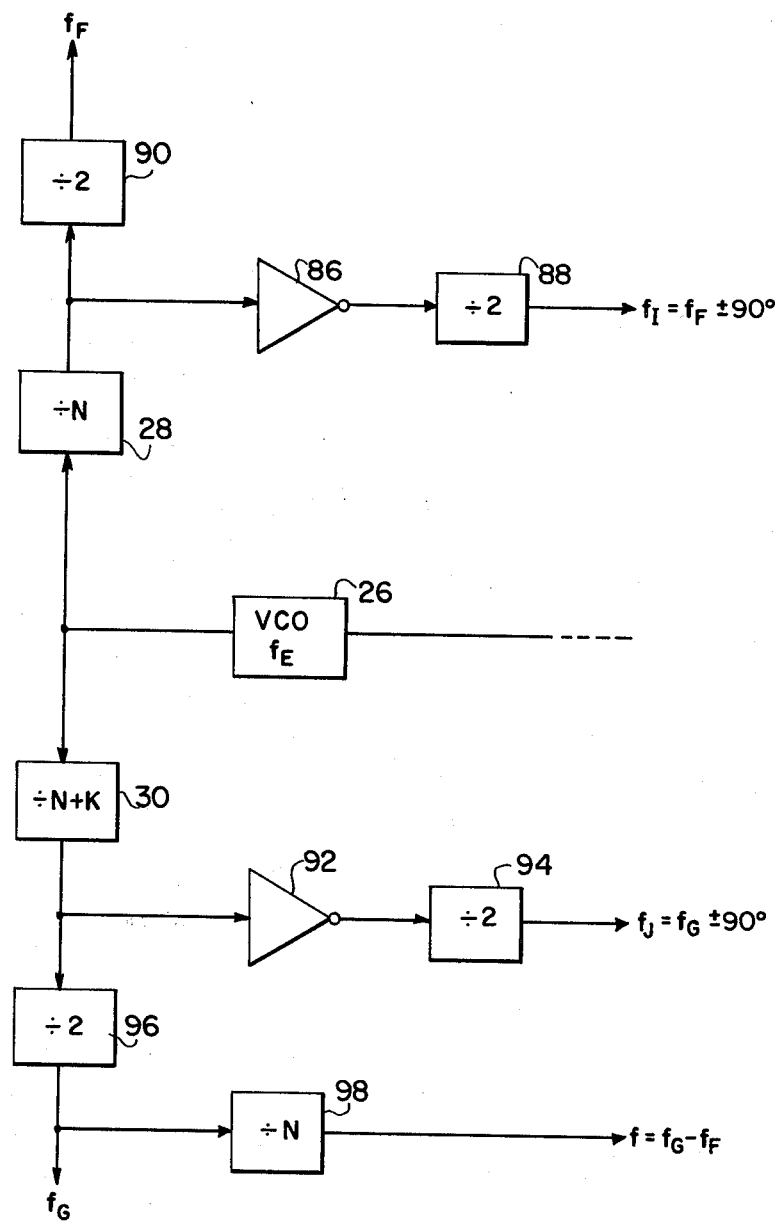
FIG. 7 is a block diagram illustrating another alternative means for generating mark and space mix frequencies for detection.

Or, for example, referring to FIG. 7 a voltage controlled oscillator 26 is coupled to divider 28 and to divider 30. The output of divider 28 is coupled to an inverter buffer 86 which in turn is coupled to a divider 88 having a divisor equal to 2. Divider 28 is also coupled to a second divider 90 having a divisor equal to 2. Divider 30 is coupled to an inverter buffer 92 which in turn is coupled to a divider 94 having a divisor equal to 2. In addition, the output of divider 30 is coupled to a divider 96 having divisor equal to 2 the output of which is coupled to a divider 98 having a divisor equal to N. The output of divider 88 is shown as $f_I$, the output of divider 90 is shown as $f_F$, the output of divider 94 is shown as $f_J$ and the output of divider 96 is shown as $f_G$. In addition, the output of divider 98 is equivalent to $(f_G - f_F)$ if $k=1$.

An example of the operation of the above scheme is as follows. If K equals 1, N equals 50 and $f_E$ equals 867 KHz, then $f_G$ equals 8500 Hz and $f_F$ equals 8670 Hz. Thus, we have two frequencies 170 Hz apart. If $f_E$ is changed to 880 KHz, then $f_G$ equals 8627.5 Hz and $f_F$ equals 8800 Hz and we would have two frequencies 172.5 Hz apart. One advantage to this system is when K equals 1, $f_G$ is exactly N times the frequency difference and this feature affords a very convenient display of the amount of frequency shift by simply coupling f, the output of divider 98, to a frequency counter. The divide by 2, and the invert and divide by 2 sections are simply a convenient method of deriving two signals separated by 90° phase shift. Note that in order to obtain a 90° phase shift with this method, a symmetrical square wave is needed.

Figure 2:
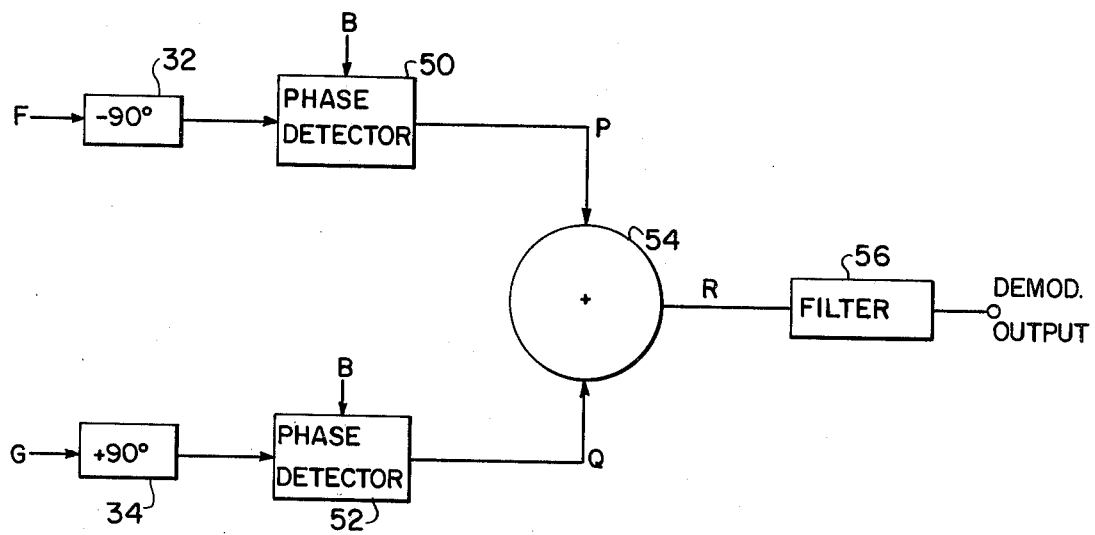
FIG. 2 is a block diagram showing the combination of demodulated tones and a single "matched filter" to limit the noise bandwidth of the demodulator output.

FIG. 2 shows a very simple scheme to derive a single demodulator output from the two outputs shown in FIG. 1. Phase detectors 50 and 52 are driven respectively with signals at points I and J that are in phase and 180° out of phase with the space and mark tones at point B. Therefore, when a mark tone is being received, phase detector 52 forces points Q and R to go negative. When a space tone is being received phase detector 50 forces points P and R to go positive. Note that phase detector 50 averages zero at its output when a mark tone is received, and that phase detector 52 will average zero at its output when a space tone is being received. From point R, the signal passes through filter 56 which is a low pass filter matched to the data rate bandwidth.

In an application where the FSK tones are recorded and/or played on a medium such as magnetic tape, the speed of which is not constant, voltage controlled oscillator 26 would compensate for tape speed variation. In this case since the original mark and space tones that were produced (and then recorded) are quite stable, the time constants controlling voltage controlled oscillator 41 could be made extremely long. The time constant on voltage controlled oscillator 26 would be made short enough to allow this voltage controlled oscillator to track the fastest variations in tone frequencies due to the record/play medium having speed variations. For example, if the tape playback speed were doubled, and mark and space frequencies will also double. Of course, the difference between mark and space frequencies will double. But if the frequency of voltage controlled oscillator 26 is doubled, then the output frequencies at both points F and G are doubled so that the demodulators stay in lock. In addition, voltage controlled oscillator 41 is independent of the tape speed variations, making it possible to have an extremely long time constant on voltage controlled oscillator 46 for this type of application.

The system described takes full advantage of known mark and space tone frequency difference stability. In most frequency shift key installations that use single side band to transmit frequency shift key data, the amount of frequency shift is quite stable. Advantage of this stability is taken by making the time constant on voltage controlled oscillator 26 extremely long and allowing voltage controlled oscillator 41 to track any carrier frequency drift. No other demodulator system takes advantage of this system-oriented stability.

In most installations that record frequency shift key tones on magnetic tape, the original tone frequencies are quite stable. Advantage of this inherent stability can be taken by making the time constant of voltage controlled oscillator 41 extremely long and allowing voltage controlled oscillator 26 to track any tape speed variations.

The frequency shift key demodulator according to the present invention is highly tolerant to overall frequency drift. When a single side band radio link is used, the time constant on voltage controlled oscillator 26 is extremely long. Voltage controlled oscillator 41 effectively has continuous phase frequency information. Thus voltage controlled oscillator 41 can maintain frequency lock at all times. Dual phase locked dual tone decoder demodulators must relock after each interruption by the adjacent tone and/or noise. Thus, with equal loop bandwidths, the system according to the present invention can tolerate faster frequency drift rates than the dual phase lock tone decoders, yet its performance in interference, fading, and especially selective fading conditions is far superior to current systems since the demodulator remains locked as long as either a mark or space tone is being received.

In addition, the system according to the present invention maintains a high probability of detection. Other types of phase lock systems must first obtain phase lock on each tone each time it is received. Thus, all of the advantages of synchronous detection are not achieved. however, since voltage controlled oscillator 41 has continuous phase and frequency information, true synchronous detection is possible. Because the tones are detected synchronously, signals with extremely low signal to noise ratios have a higher probability of being detected accurately than in conventional systems.

Furthermore, the system according to the present invention maintains a higher rejection of interference than state of the art system. Most of the systems in current use utilize post-detection filtering and the degree of interference rejection achievable in such systems is largely a function of complex preselection filters. Even in the case of the dual phase lock decoder, loop bandwidth must be made wide enough to allow relocking on each tone. As a result, interference that would not pass through a filter matched to the data rate bandwidth can "steal" one or both of the phase lock loops in the dual tone decoder. For the radio frequency link situation, loop bandwidth on voltage controlled oscillator 26 is extremely narrow. Voltage controlled oscillator 41 has continuous phase information. Because voltage controlled oscillator 41 has this continuous phase information, loop bandwidth on this voltage controlled oscillator can be made as small as one desires. The only limitation would be that the bandwidth must be large enough to track the fastest carrier frequency drift rate. Therefore, in this demodulator, the interference rejection achieved is almost solely a function of any post-detection filter which may be added (usually matched to the data rate bandwidth). Since such a filter would be a low pass type, extremely sharp stop bands, relative to bandpass filters centered on the input tones, can be obtained with simple low order filters. Similarly, for the case in which tones are recorded on magnetic tape, the bandwidth on voltage controlled oscillator 26 need be only wide enough for it to track the fastest tape speed fluctuation.

Further embodiments and modifications will readily come to those of ordinary skill in the art having the benefit of these teachings. It is, therefore, to be understood that this invention is not to be limited thereto and that such modifications and embodiments are intended to be included within the scope of the appended claims.

What is claimed and desired to be secured by Letters Patent of the United States is:

1. A frequency shift key detector for demodulating mark and space tone frequency shifts from a carrier frequency comprising:
  first phase locked loop means for locking onto and tracking the difference in frequency between said mark and space tones, said first phase locked loop means including:
    a first space tone sub-loop comprising:
      first phase detector means for receiving space tones and comparing them with a space tone loop signal;
      a first summer having multiple inputs, one positive input of which is coupled to the output of said first phase detector;
      first filter means coupled to the output of said first summer;
      a first voltage controlled oscillator having its control input coupled to the output of said first filter means; and
      first divider means coupled to the output of said first voltage controlled oscillator and providing said space tone loop signal coupled to said first phase detector means;

a first mark tone sub-loop sharing in common with said first space tone sub-loop said first summer means, said first filter means, and said first voltage controlled oscillator and in addition to said elements shared in common further including:

second divider means coupled to the output of said first voltage controlled oscillator for generating a mark tone loop signal; and second phase detector means for receiving mark tones and comparing them with said mark tone loop signal, wherein the output of said second phase detector means is coupled to a negative input of said first summer;

second phase locked loop means for locking onto and tracking the overall frequency drift of said mark and space tones, said second phase locked loop means including:

a second space tone sub-loop sharing said first phase detector means with said first space tone sub-loop and further comprising:

a second summer having multiple inputs, wherein one positive input is coupled to the output of said first phase detector means and another positive input is coupled to the output of said second phase detector means;

a second filter means coupled to the output of said second summer;

a second voltage controlled oscillator having its control input coupled to the output of said second filter means; and a mixer having a first input for receiving said carrier, mark and space frequencies and a second input for receiving an input mix signal and an output providing frequency translated mark and space tones, wherein said second input of said mixer is coupled to the output of said second voltage controlled oscillator and wherein the output of said mixer is coupled to said first phase detector for supplying said mark and space tones thereto;

a second mark tone sub-loop, sharing in common with said second space tone sub-loop said mixer, said second summer, said second filter means, and said second voltage controlled oscillator and sharing in common with said first mark tone sub-loop said second phase detector means wherein said second phase detector means is coupled to the output of said mixer.

2. The frequency shift key detector of claim 1 further including:

means responsive to said first phase locked loop means for generating a space tone detection mix signal coherent with said translated space tone signals to be detected;

means responsive to said first phase locked loop means for generating a mark tone detection mix signal coherent with said translated mark tone signals to be detected;

third phase detector means having one input coupled to said means for generating a space tone detection mix signal and a second input coupled to said output of said mixer providing translated space and mark tones whereby said third phase detector means coherently detects the presence of space tone frequencies;

fourth phase detector means having one input coupled to said means for generating a mark tone detection mix signal and a second input coupled to said output of said mixer providing translated space and mark tones, whereby said fourth phase detector means coherently detects the presence of mark tone frequencies.

3. The frequench shift key detector of claim 2 further including a detection summer having one input coupled to the output of said third phase detector means and one input coupled to the output of said fourth phase detector means, wherein said detection summer output includes both mark and space tones which have been coherently detected.

4. The frequency shift key detector of claim 2 further including means for slewing said first summer means for tuning said demodulator.

5. The frequency shift key detector of claim 2 further including means for slewing said second summer means for tuning said detector.

6. The frequency shift key detector of claim 2 wherein said first divider means includes a divider having a divisor equal to N and said second divider means includes a divider having a divisor equal to N+K.

7. The frequency shift key detector of claim 2 wherein said first phase locked loop means includes an integrator coupling said output of said first filter means to said control input of said first voltage controlled oscillator.

8. The frequency shift key detector of claim 2 wherein said second phase locked loop means includes an integrator coupling said output of said second filter means to said control input of said second voltage controlled oscillator.

9. The frequency shift key detector of claim 2 wherein said means responsive to said first phase locked loop means for generating a space tone detection mix signal coherent with said translated space tone signal includes a phase shifter coupled to said first divider means.

10. The frequency shift key detector of claim 2 wherein said means responsive to said first phase locked loop means for generating a detection mix signal coherent with said translated mark tone signal includes a 90° phase shifter coupled to said second divider means.

* * * * *